3,459,494
PROCESS FOR DECOMPOSITION OF OXIDES OF NITROGEN

Samuel W. Harris, Chicago, Ill., Edwin F. Morello, Hammond, Ind., and Gavin H. Peters, Centerville, Ohio, assignors to Standard Oil Company, Chicago, Ill., a corporation of Indiana
No Drawing. Filed Dec. 14, 1966, Ser. No. 601,561
Int. Cl. B01d 53/00
U.S. Cl. 23—2                    10 Claims This invention relates to a process for the decomposition of oxides of nitrogen (the terms "oxides of nitrogen" and "nitrogen oxides" are used interchangeably herein and mean all oxides of nitrogen including $NO_2$, NO and $N_2O$, etc., and mixtures thereof) to nitrogen and oxygen and more particularly to a process utilizing a particular catalyst system.

Prior processes involving the catalytic decomposition of nitrogen oxides have generally utilized noble metal catalysts, such as platinum and paladium. Besides the high cost of these catalysts, these processes have not been entirely satisfactory. Usually, the degree of decomposition with such catalysts is only about 60–70%, which is unacceptable for many uses, including consumption by human beings where an air mixture is needed.

We have now discovered a process for the conversion of nitrogen oxides into nitrogen and oxygen, which process is capable of producing a breathable, oxygen enriched atmosphere, for use, for example in space travel applications, or reduction of air pollution by decomposition of industrial gas streams, purification of automobile exhaust gases, etc. It is thought that NO and $NO_2$ are some of major causes of smog formation in some areas. Briefly, the process of the present invention comprises contacting a nitrogen oxide with a high-melting, solid catalyst which includes alkali metal oxides, alkali metal silicates, alkaline earth metal oxides, alkaline earth metal silicates, and mixtures thereof at a temperature above about 700° C. for a time sufficient to convert the nitrogen oxide to nitrogen and oxygen. It may be desirable in some instances to use an absorbing step when the decomposition product contains small amounts of unconverted nitrogen oxide. In this event the decomposition product is sent to an absorbing medium in which the unconverted nitrogen oxide is absorbed, and the remaining gas is, therefore, a useful combination of nitrogen and oxygen. It is also contemplated by the present invention that solid ammonium nitrate grains may be used as the source of nitrogen oxides in possible space exploration. The solid system has the advantages of simplified storage and the density of the solid is greater than that of the desired reaction products providing for a considerable saving of storage space.

The catalysts for the present process comprises an oxide and/or a silicate of alkali and/or alkaline earth metal. These metals include sodium, potassium, cesium, lithium, rubidium, etc.; and barium, calcium, strontium, etc. Sodium, potassium, barium, calcium, and strontium, and mixtures thereof, are particularly suitable, especially a mixture of the latter three. It may be desirable to use compounds, which when heated to the reaction temperature, yield the particular catalyst sought. Particularly suitable are the carbonates, nitrates, etc.

It may be desirable to use the catalysts on a suitable support. One of the advantages of using a support is that it may obviate certain fusion problems related to various catalytic materials. It is thought that nitrate-nitrite mixtures may form during decomposition. These mixtures are low-melting solids which can fuse in the catalyst chamber resulting in a plugging of the chamber. Suitable supports comprise alundum cement, porcelain, silica, extruded alumina, alumina beads, and the like. The particular support will, of course, depend upon the catalysts present.

The nitrogen oxide is contacted with the above-described catalyst at a temperature above about 700° C., advantageously between about 700° C. and about 1100° C., and preferably between 800° C. and 1000° C., for a time sufficient to convert nitrogen oxide to nitrogen and oxygen.

The degree of conversion or decomposition will depend upon the particular catalyst and temperature utilized. It is possible to obtain conversions as high as 98 to 100% which is particularly advantageous in view of the possible utilization of the converted products for human beings.

When the product has unconverted nitrogen oxides, it may be desirable to remove the nitrogen oxides by treating the product with an absorbing medium, such as lead peroxide, and thereby produce a gas containing essentially only nitrogen and oxygen.

Flow rates for complete conversion are determined by the reaction temperature due to increasing catalyst activity at higher temperatures. At temperatures below 700° C. reaction rates are relatively low. It is, therefore, contemplated by the present invention that any basic system stable at 700° C. and above and reactive toward nitrogen oxides will serve as a catalyst.

A preferred embodiment of the process of the present invention may be carried out in the following manner:

(1) Pre-heat a catalyst bed to 800–1000° C.;
(2) Pass a gas containing oxides of nitrogen over the catalyst;
(3) Pass the hot reaction gases through a heat exchanger to pre-heat the entering gases and to reduce the temperature of the product to near ambient conditions; and
(4) Subject the product to a suitable absorbing column to remove trace amounts of unreacted nitrogen oxides which may be present as contaminants.

The pressure at which the conversion may be accomplished is not critical, and therefore any convenient pressure may be used. The upper temperature limit will usually depend upon equipment and catalyst limitations. Therefore, if a solid catalyst is desired, and the catalyst melts about 1000°, it would be necessary to operate the conversion at below 1000°.

The process of the present invention has been found to be highly effective in the conversion of nitric oxide and nitrogen dioxide within the temperature range disclosed. This is a surprising result in view of the prior art teachings that these oxides are extremely difficult to decompose and require much higher temperatures. Furthermore, we have been able to eliminate the presence of platinum in the catalyst, thereby reducing the cost and greatly aiding the commercial significance of this invention. And most significantly, we have been able to provide a process which decomposes nitrogen oxides almost completely with high flow rates.

In a particular embodiment of the invention, for use in purifying automobile exhaust gases, a catalyst chamber is placed in the exhaust system and heated to the desired temperature. The gases, containing nitrogen oxides are passed through the chamber. It may be desirable to provide a heat exchanger wherein the decomposed gases are cooled and entering gases are heated. The amount of catalyst will depend upon the degree of combustion of the fuel and the operating level of the automobile. The exhaust gases so treated, exit substantially free of all harmful nitrogen oxides.

The following examples are given by way of illustration:

EXAMPLE I

Nitrogen dioxide was decomposed by passing the gas over several catalyst beds. The apparatus used to test the various catalyst systems consists of a 1¼" ceramic tube wrapped with a 14-gauge nichrome wire heater and was insulated with high temperature pipe insulation. A chromelalumel thermo-couple provides temperature measurements in the catalyst bed, and gas samples were collected in a hypodermic syringe and analyzed on a Beckman GC-2A gas chromatograph to determine the degree of conversion. The particular catalyst, the temperature, and the flow rate are given in Table I.

TABLE I.—NITROGEN DIOXIDE CONVERSION WITH TEMPERATURE AND FLOW RATE

| Catalyst | Temp., °C. | Space, vel., hr.$^{-1}$ | Percent conversion |
|---|---|---|---|
| (1) Calcium-strontium barium oxide mixture (equal parts). | 565 | 35 | 0 |
| | 625 | | 80 |
| | 825 | 27.5 | 100 |
| | 890 | 275–220 | 98–100 |
| | 800 | 220 | 100 |
| (2) Item (1) with 0.5% platinum | 800 | 25–40 | 74 |
| | 1,000 | 25 | 98 |
| | 1,000 | 55 | 85 |
| (3) Platinum on alumina (extruded) aeroform PHF-5 (0.6% platinum). | 800 | 13.5 | 56 |
| | 950 | 80 | 55 |
| | 950 | 27.5 | 93 |
| (4) Barium oxide on aeroform PHF-5 (25% BaO). | 935 | 60 | 95 |
| | 840 | 95–110 | 94 |
| (5) Barium oxide on aeroform PHF-5 (50% BaO). | 960 | 135 | 98 |
| | 875 | | 90 |
| (6) Barium oxide on unglazed porcelain (25% BaO). | 980 | 27.5 | 97 |
| (7) Barium-strontium oxide on aeroform. | 1,015 | 90 | 90 |
| | 980 | 110 | 95 |
| | 900 | 55 | 90 |
| | 850 | 75 | 73 |

The above results demonstrate that the processes utilizing the alkaline earth metal oxide produced high conversion with some even being as high as 98–100%.

EXAMPLE II

Decomposition processes were carried out on nitrogen dioxide with a sodium silicate and a platinum catalyst. Table II lists the results.

TABLE II

| | $NO_2$ conversion, 0.6% Pt on $Al_2O_3$ | $Na_4SiO_4$ |
|---|---|---|
| Temperature (° C.) | 900 | 900 |
| Gas space velocity, hr.$^{-1}$ | 15 | 300 |
| Percent $O_2$ | 46.1 | 61.3 |
| Percent $N_2$ | 28.9 | 32.4 |

The above results demonstrate the improved performance of the sodium silicate catalyst over the platinum catalyst. The percent conversion for the sodium silicate at a space velocity of 300 was 93.7% as compared to 75% for the platinum catalyst, at the much lower space velocity of 15.

EXAMPLE III

Other tests on nitrogen dioxide were carried out with catalysts listed in Table III. The percent conversion is the sum of the values for oxygen and nitrogen in Table III.

TABLE III

| Catalyst | Temp. (° C.) | Space vel. hr.$^{-1}$ | Percent $O_2$ | Percent $N_2$ |
|---|---|---|---|---|
| CaO·SrO·BaO | 890 | 300 | 64 | 34 |
| $Ba_2SiO_4$ | 940 | 45 | 42 | 30 |
| $Cs_2O, BaO, Al_2O_3$ | 860 | 125 | 63 | 32 |
| $BaO·K_2O·Al_2O_3$ | 875 | 120 | 65 | 34 |
| 25% BaO on $Al_2O_3$ beads | 970 | 60 | 58 | 30 |
| BaO-Alundum cement | 775 | 45 | 58 | 32 |
| 10% BaO on activated $Al_2O_3$ | 965 | 45 | 40 | 23 |
| BaO on silica gel | 950 | 25 | 38 | 20 |
| $3Na_2O·Al_2O_3$ | 890 | 60 | 65 | 26 |

The above results demonstrate the benefits provided by the catalysts based on the oxides and silicates of the alkali metals and the alkaline earth metals, and the relative merits of various supports for the catalysts.

We claim:

1. A process for providing substantially complete decomposition of nitrogen oxide into nitrogen and oxygen, which method comprises contacting nitrogen oxide with a high melting, catalyst selected from at least one member of the group, consisting of alkali metal oxide, alkali metal silicates, alkaline earth metal oxides, alkaline earth metal silicates, and mixtures thereof at a temperature above about 700° C. for a time sufficient to convert the nitrogen oxide to nitrogen and oxygen.

2. The process of claim 1 wherein said catalyst is an alkali metal oxide.

3. The process of claim 1 wherein said catalyst is an alkali metal silicate.

4. The process of claim 1 wherein said catalyst is an alkaline earth metal oxide.

5. The process of claim 1 wherein said catalyst is an alkaline earth metal silicate.

6. The process of claim 1 wherein said temperature is between about 700–1100° C.

7. The process of claim 1 wherein said temperature is between about 800–1000° C.

8. The process of claim 6 wherein said catalyst is barium oxide.

9. The process of claim 1 including the step of passing the decomposed nitrogen oxide stream from the catalyst to a nitrogen oxide absorbing medium to remove unreacted nitrogen oxide.

10. The process of claim 1 wherein said catalyst is supported upon a catalyst support.

References Cited

UNITED STATES PATENTS

| 1,487,647 | 3/1924 | Fauser | 23—220 |
| 2,684,283 | 7/1954 | Ogg et al. | 23—2 |
| 2,910,343 | 10/1959 | Childers et al. | 23—2 |
| 3,398,101 | 8/1968 | Baker et al. | 23—220 X |

OSCAR R. VERTIZ, Primary Examiner

E. C. THOMAS, Assistant Examiner

U.S. Cl. X.R.

23—4, 159, 220, 221